(12) United States Patent
Taira (10) Patent No.: US 9,417,827 B2
(45) Date of Patent: Aug. 16, 2016

(54) IMAGE FORMING APPARATUS THAT CAN PRINT TO AN INDEX PAPER, IMAGE FORMATION METHOD, AND RECORDING MEDIUM

(71) Applicant: KYOCERA Document Solutions Inc., Osaka (JP)

(72) Inventor: Yoshiyuki Taira, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/523,855

(22) Filed: Oct. 25, 2014

(65) Prior Publication Data
US 2015/0116737 A1    Apr. 30, 2015

(30) Foreign Application Priority Data
Oct. 25, 2013  (JP) .................................. 2013-222555

(51) Int. Cl.
*G06K 15/02*    (2006.01)
*G06F 3/12*     (2006.01)
*G06K 15/00*    (2006.01)
*G03G 15/00*    (2006.01)

(52) U.S. Cl.
CPC .............. *G06F 3/1256* (2013.01); *G03G 15/00* (2013.01); *G06F 3/1208* (2013.01); *G06F 3/1243* (2013.01); *G06F 3/1258* (2013.01); *G06F 3/1285* (2013.01); *G06K 15/021* (2013.01); *G06K 15/005* (2013.01)

(58) Field of Classification Search
CPC .... B41J 11/008; G06F 3/1205; G06F 3/1242; G06F 3/125; G06F 3/1253; G06F 3/1285; G06F 3/1208; G06F 3/1243; G06F 3/1258; G06F 3/1256; G06K 15/005; G06K 15/021; G03G 15/00
USPC ..................................... 358/1.1, 1.6
See application file for complete search history.

(56) References Cited

U.S. PATENT DOCUMENTS

2008/0014002 A1*  1/2008  Edamatsu ....................... 400/76
2008/0266596 A1*  10/2008  Sato ............................. 358/1.15

FOREIGN PATENT DOCUMENTS

| JP | H08-127159 A  | 5/1996  |
|----|---------------|---------|
| JP | 2008-021003 A | 1/2008  |
| JP | 2009-271644 A | 11/2009 |

* cited by examiner

*Primary Examiner* — Iriana Cruz
(74) *Attorney, Agent, or Firm* — Hawaii Patent Services; Nathaniel K. Fedde; Kenton N. Fedde (57) ABSTRACT

Provided is an image forming apparatus that prints an index label easily and set up a text printed into a standard size section and an index label section to a manuscript. An index label information setting part sets up index label information. An index label preview display part displays a preview of an index label by using the index label information. A shift image display part displays a shift image on the preview. The shift image is an image when a text printed to a standard size section and an index label section is set to the manuscript, and an image area is moved in case that the manuscript is printed the text of the manuscript to the index label.

6 Claims, 8 Drawing Sheets

IMAGE FORMING APPARATUS THAT CAN PRINT TO AN INDEX PAPER, IMAGE FORMATION METHOD, AND RECORDING MEDIUM

INCORPORATION BY REFERENCE

This application is based on and claims the benefit of priority from Japanese Patent Application No. 2013-222555 filed on Oct. 25, 2013, the contents of which are hereby incorporated by reference.

BACKGROUND

The present disclosure is related to an image forming apparatus, an image formation method, and a recording medium that can print to a paper having an index label (henceforth an "index paper").

According to a case of typical image forming apparatus, such as a printer, a multifunctional printer, multifunctional peripheral equipment, or a MFP (Multifunctional Peripheral) has function that enables to print to an index paper. The index paper is a standard-size paper, such as A4 size or letter size, or the like, where an index label is provided. Each index label is outside the range of standard size, and a size and a position of it is varied. Thus, when a user prints to the index paper, a printing request is performed by using a manuscript, which is set up a text, or the like, printed into a standard size section and an index label section, respectively. In such a case, when the user mistakes the mounting position of the manuscript and has the printing request, an image cannot be printed satisfactorily to the standard-sized paper and the index label. As this measure, in a case of an image forming apparatus, set up information, such as a size of an index paper, a position of an index label, a text printed to an index label, or the like, can be set by using a screen. For example, there is a recent printer controller, which can input from a screen information, including a setup of the information on a tab paper (index paper) or a tab (index label), a title of the text printed to the tab, or the like. The printer controller displays an image of the tab with which the tab paper and the title information to display on a screen (henceforth a "preview"). Thereby, before the user actually prints the index paper, the print image of the index paper or the tab can be verified.

SUMMARY

An image forming apparatus of the present disclosure is an image forming apparatus that can be printed to an index paper. An index label information setting part sets up index label information. An index label preview display part displays a preview of an index label by using the index label information. A shift image display part displays a shift image on the preview. The shift image is an image that a text printed to a standard size section and an index label section is set to the manuscript, and an image area of the manuscript is moved in case of being printed the text of the manuscript to the index label.

An image formation method of the present disclosure is an image formation method performed by an image forming apparatus that can print to an index paper. In this method, index label information is set up, firstly. Then, a preview of an index label is displayed by using the index label information. Further, a shift image that a text printed to standard size section and an index label section is set to the manuscript, and an image area of the manuscript is moved in case of printing the text of the manuscript to the index label, is displayed on the preview.

A recording medium of the present disclosure is a non-transitory recording medium that is recorded an image formation program executed by an image forming apparatus, which can be printed on an index paper. The program functions the image forming apparatus as an index label information setting part, an index label preview display part, and a shift image display part. The index label information setting part sets up index label information. The index label preview display part displays a preview of an index label by using the index label information. The shift image display part displays a shift image on the preview. The shift image display part displays a shift image on the preview. The shift image is an image that a text printed to a standard size section and an index label section is set to the manuscript, and an image area of the manuscript is moved in case of being printed the text of the manuscript to the index label.

DETAILED DESCRIPTION

Hereinafter, the embodiment for carrying out the present disclosure (henceforth a "the embodiment") is explained as refer to drawings. An image forming apparatus 1 of the embodiment is an image forming apparatus that forms images, such as a printer, a multifunction printer, multifunctional peripheral equipment, or MFP. As refer to FIG. 1, the image forming apparatus 1 includes a manuscript reading part 2, a manuscript feeding part 3, a body part 4, and an operation part 5. The manuscript reading part 2 is allocated in an upper part of the body part 4, and the manuscript feeding part 3 is allocated in the upper part of the manuscript reading part 2.

Figure 1:
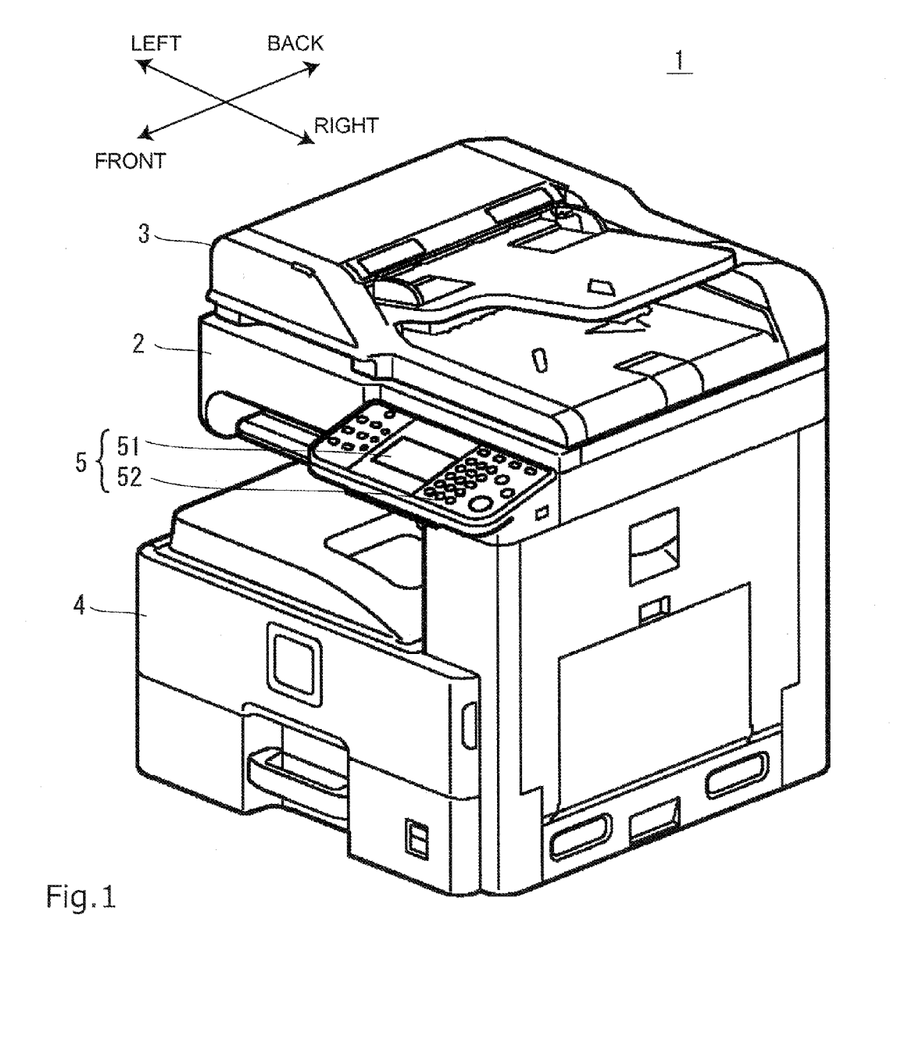
FIG. 1 is an appearance perspective view of an image forming apparatus related to the embodiment of the present disclosure.

The operation part 5 that performs a setup and instructions of operation for the image forming apparatus 1 is allocated on a front side of the image forming apparatus 1. The operation part 5 includes a liquid crystal display part 51 and a manual operation button 52. A user inputs instructions by the operating operation part 5, performs various kinds of setup of the image forming apparatus 1, and carries out various functions, such as image formation. The liquid crystal display part 51 shows a state of the image forming apparatus 1. Also, the liquid crystal display part 51 displays an image formation situation and a number of prints. Also, by using the liquid crystal display part 51, various setup, such as function of double-side printing, a display in white or black background, or the like, magnification setup, and a concentration setup, or the like are instructed with a touch panel. The manual operation button 52 includes a start button, a stop/clear button, a reset button, a numeric keypad, or the like. The start button instructs the start of the image formation. The stop/clear button instructs the stop of the image formation. The reset button is used in case of making various setup of the image forming apparatus 1 to a default state.

Figure 2:
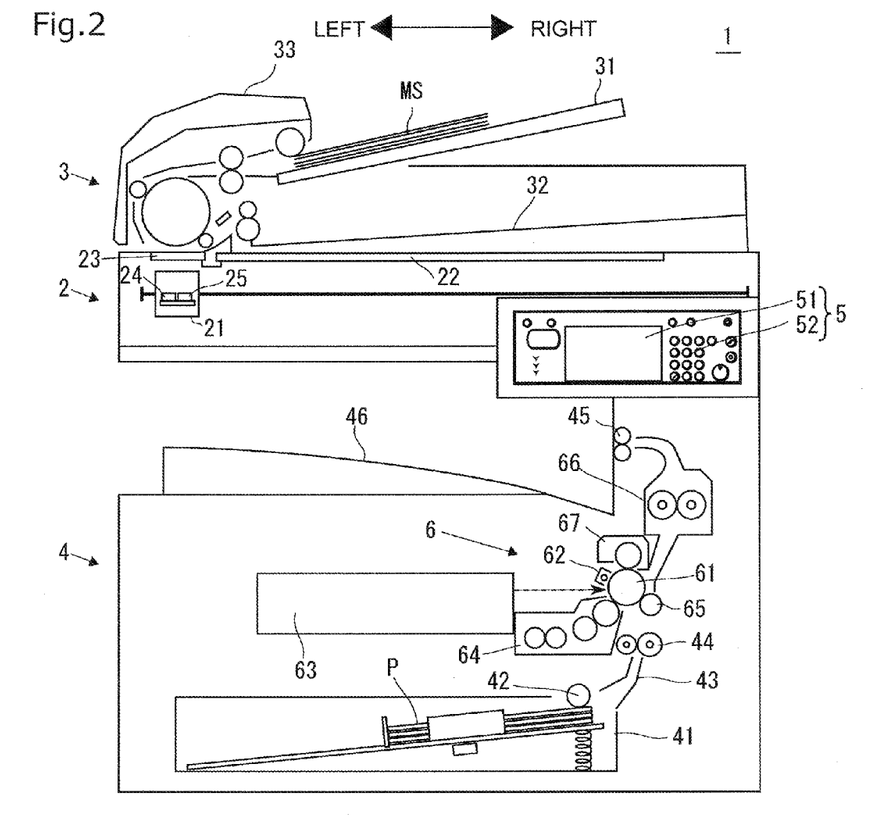
FIG. 2 is a section schematic diagram showing an internal configuration of the image forming apparatus related to the embodiment of the present disclosure.

As refer to FIG. 2, the manuscript reading part 2 provides a scanner 21, a platen glass 22, and a manuscript reading slit 23. The scanner 21 provides a light source 24 and a light receiving part 25 including a sensor, or the like. The manuscript reading part 2 is movable to a conveying direction of a manuscript MS (manuscript) by the manuscript feeding part 3. The manuscript reading slit 23 is a slit formed in the direction that intersects perpendicularly with the conveying direction of the manuscript MS by the manuscript feeding part 3.

The manuscript feeding part 3 provides a manuscript placing part 31, a manuscript discharge part 32, and a manuscript transport mechanism 33. The manuscript MS set to the manuscript placing part 31 is conveyed one sheet at a time by manuscript transport mechanism 33, it is conveyed in a position that faces manuscript reading slit 23, and after that, it is ejected to manuscript discharge part 32. The manuscript feeding part 3 and the manuscript reading part 2 are connected with a hinge mechanism at a back side of the image forming apparatus 1. Therefore, the manuscript feeding part 3 functions as a platen cover in case of opening and closing an upper surface of the platen glass 22. By opening the manuscript feeding part 3, the upper surface of the platen glass 22 is opened, and it will be in a state where the manuscript MS can be set to the platen glass 22.

In a state where the manuscript MS is not set to the manuscript placing part 31 or an open-state where the manuscript feeding part 3 (platen cover) is opened, when reading of the manuscript MS is instructed by the manual operation button 52 of the operation part 5, and the manuscript MS set to the platen glass 22 will be read. When reading the manuscript MS placed on the platen glass 22, the scanner 21 is moved to the position that faces the platen glass 22. Subsequently, the scanner 21 scans and reads the manuscript MS set to the platen glass 22 from vertical scanning direction datum line B to the vertical scanning direction that intersects with the scanning direction perpendicularly and acquires image data. The scanner 21 outputs the acquired image data to the control part 7 (FIG. 3) in the body part 4.

In the state that the manuscript MS is set to manuscript placing part 31, when reading of the manuscript MS is instructed by the manual operation button 52 of the operation part 5, the manuscript MS conveyed by the manuscript feeding part 3 will be read. The manuscript MS is set to the manuscript placing part 31 as turned up a surface (side that is read a manuscript image.) Then, the manuscript MS set to the manuscript placing part 31 is conveyed by the manuscript feeding part 3 from left side. Thereby, the surface of the manuscript MS is led to an opposed position of the manuscript reading slit 23. Also, the scanner 21 is moved to the position that counters the manuscript reading slit 23, when reading the manuscript MS conveyed by the manuscript feeding part 3. Therefore, via the manuscript reading slit 23, the scanner 21 reads the manuscript MS with synchronizing a conveying action by the manuscript feeding part 3, and acquires image data. The scanner 21 outputs the acquired image data to the control part 7 (FIG. 3) in the body part 4.

The body part 4 provides a printing part 6, and it also provides a feeding part 41, a feed roller 42, a paper sheet conveying path 43, a registration roller 44, and an ejection roller 45. The feeding part 41 is a sheet paper cassette, which a plurality of paper P are stored. The feed roller 42 feeds one sheet of paper P at a time to the paper sheet conveying path 43 from feeding part 41. The paper P fed to the paper sheet conveying path 43 by the feed roller 42 is conveyed to the printing part 6 by the registration roller 44. The registration roller 44 conveys the paper P so that a head of paper P supplied from the sheet paper cassette is matched with the head of the image read from the manuscript. Then, the paper P, which record is carried out by the printing part 6, is discharged by the ejection roller 45 by an ejection space 46 formed between the manuscript reading part 2 and the body part 4. Thus, the feed roller 42, the registration roller 44, and the ejection roller 45 function as a conveyance part of the paper P.

The printing part 6 provides a photo conductor drum 61, a charging part 62, a exposure part 63, an image formation part 64, a transfer part 65, a fixing part 66, and a cleaning part 67. The exposure part 63 is an optical unit providing a laser device, a mirror, or the like. The exposure part 63 outputs and exposes the laser beam based on the image data to the photo conductor drum 61, which is uniformly electrified by the charging part 62, and forms an electrostatic latent image in the surface of the photo conductor drum 61. The image formation part 64 is a development unit that develops the electrostatic latent image formed in the photo conductor drum 61 by using the toner. The image formation part 64 makes the toner image based on the electrostatic latent image form on the photo conductor drum 61. The transfer part 65 transfers the toner image, which is formed on the photo conductor drum 61 of the image formation part 64, to the paper P. The fixing part 66 heats the paper P, which the toner image is transferred by transfer part 65, and fixes the toner image to the paper P. Then, the toner which remains on the photo conductor drum 61 is removed by the cleaning part 67.

Figure 3:
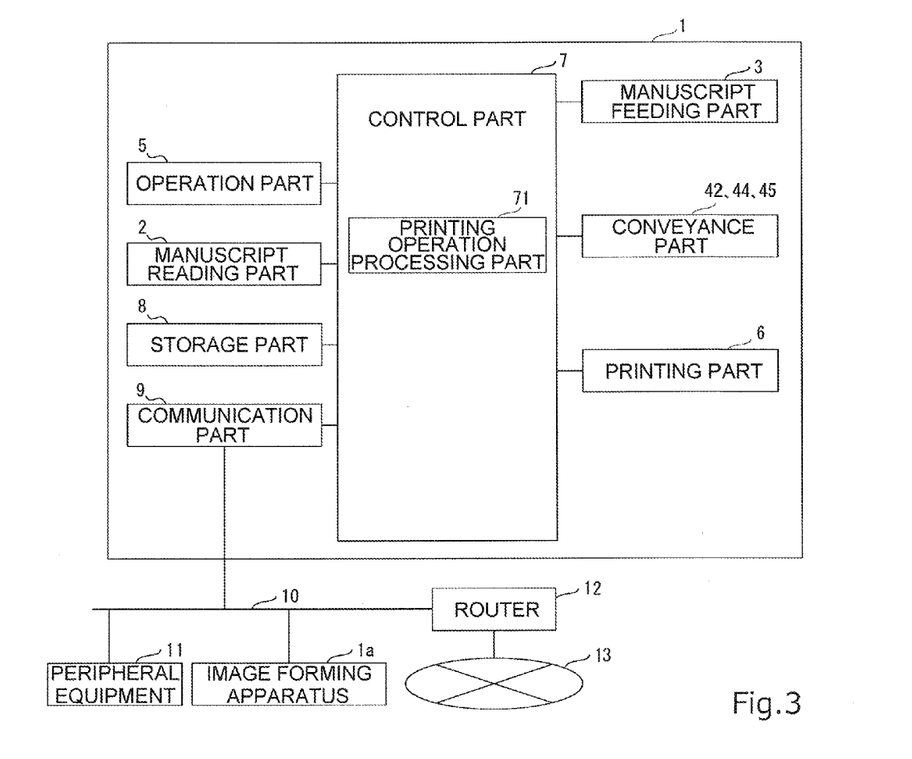
FIG. 3 is a block diagram showing a function configuration of the image forming apparatus related to the embodiment of the present disclosure.

In FIG. 3, the block diagram for a functional configuration of the image forming apparatus 1 is shown. Above-mentioned the manuscript reading part 2, the manuscript feeding part 3, the conveyance part (the feed roller 42, the registration roller 44, the ejection roller 45), the operation part 5, the printing part 6, the storage part 8, and communication part 9 are connected to the control part 7. Each part is operated and controlled by the control part 7. The control part 7 includes a printing operation processing part 71.

The control part 7 is an information processing section including a non-transitory storage part. The control program for performing operation-control of the image forming apparatus 1 is memorized in the storage part of the control part 7. The control part 7 reads the control program memorized in the storage part, expands, and executes it. Thereby, the control part 7 controls the whole apparatus according to the predetermined instructions information inputted from the operation part 5. Accordingly, control part 7 functions as an index label information setting part, an index label preview display part, a shift image display part, a shift size setting part, and an image area sifting part. Therefore, the printing operation processing part 71 performs the print operation by the instructions from the control part 7.

The storage part 8 is a non-transitory storage part, and the image data of the manuscript MS read by the scanner 21 is memorized. As for the storage part 8, various kinds of management information and setup information are memorized.

The communication part 9 includes a function that transmits and receives various data between a peripheral equipment 11, such as PC (personal computer), and other image forming apparatuses 1*a* via a network 10. Also, the communication part 9 has ability to connect an internet 13 via network 10 and router 12. Then, the communication part 9 has a function that transmits and receives various data among various communication equipment connected to the internet 13.

Figure 4:
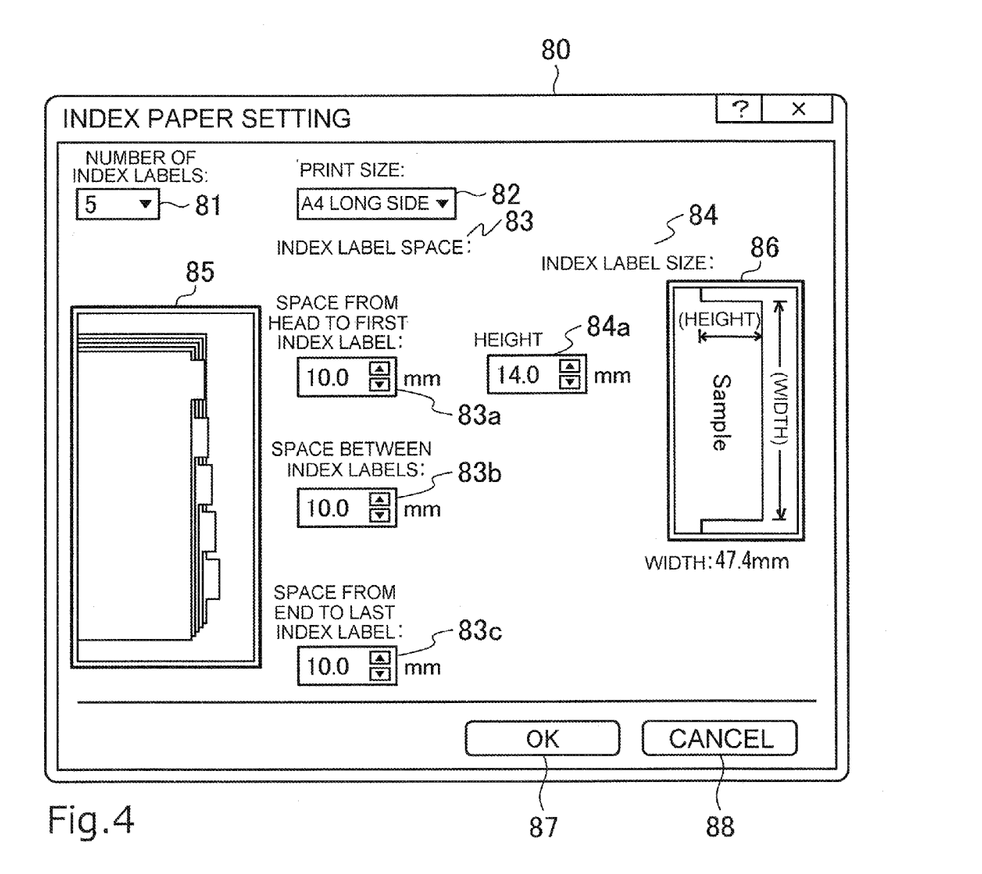
FIG. 4 is a figure showing the example of an index paper setting screen related to the embodiment of the present disclosure.
Figure 5:
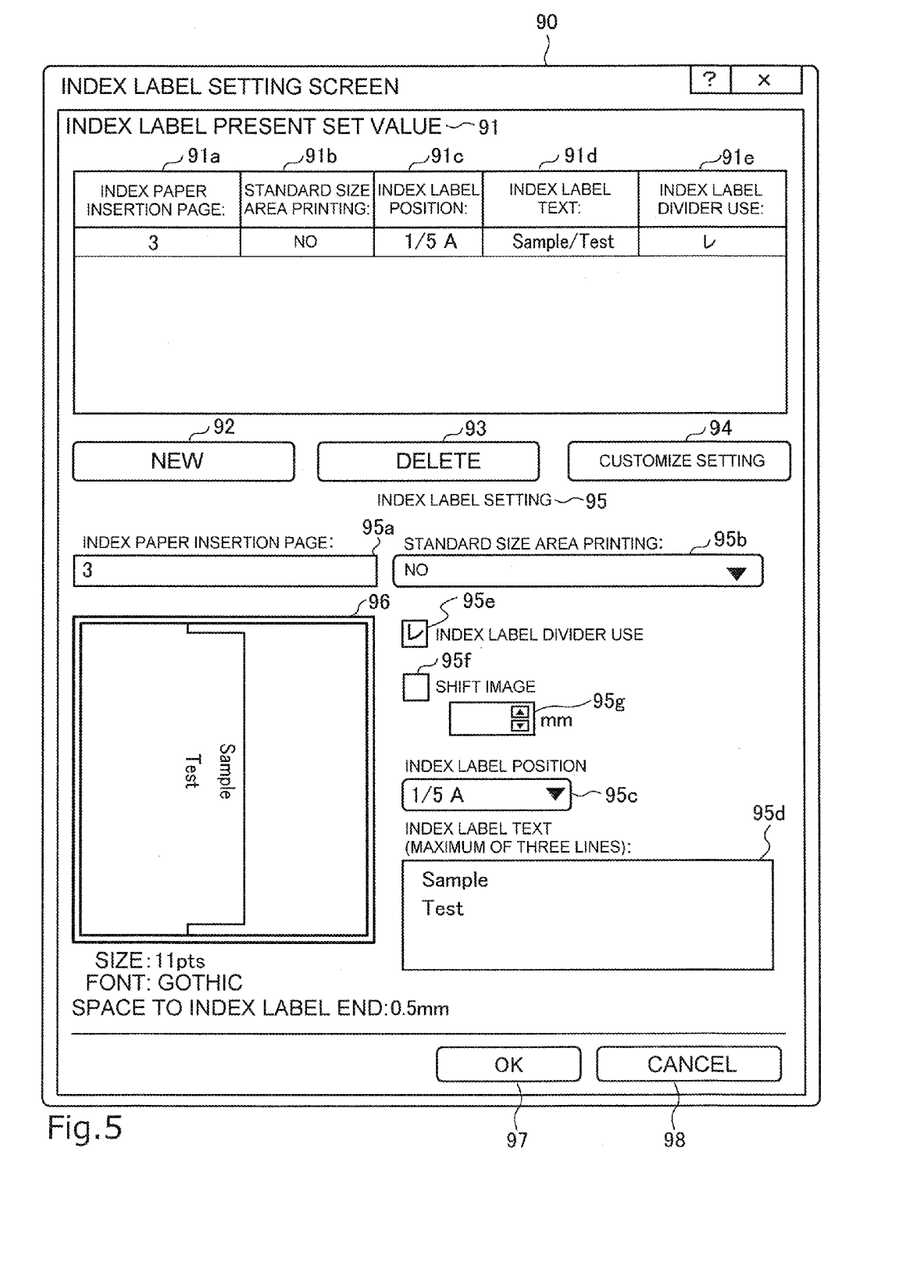
FIG. 5 is a figure showing the example of an index label setting screen related to the embodiment of the present disclosure.
Figure 6A:
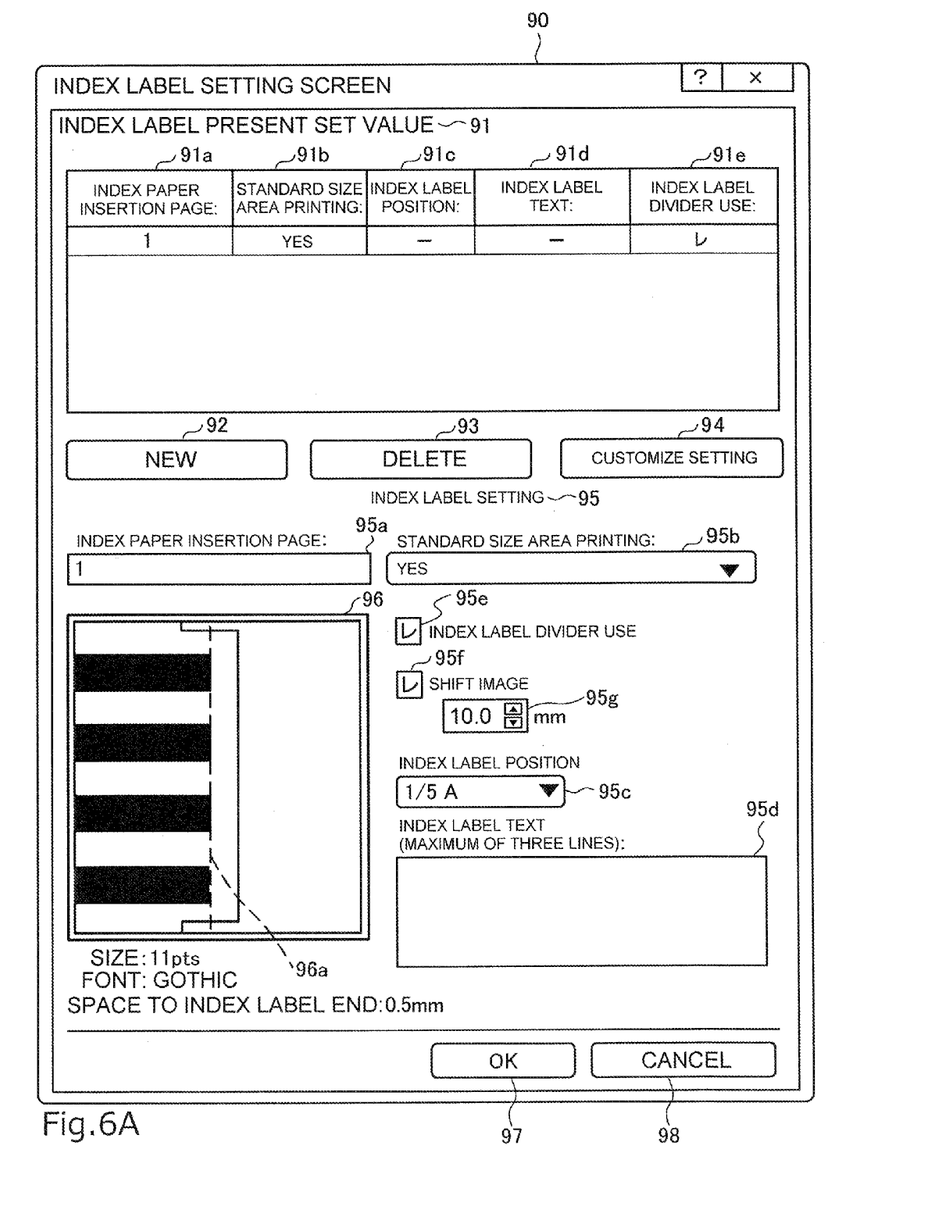
FIG. 6A is a figure showing an example of an index label setting screen where a shift image is displayed related to the embodiment of the present disclosure.
Figure 6B:
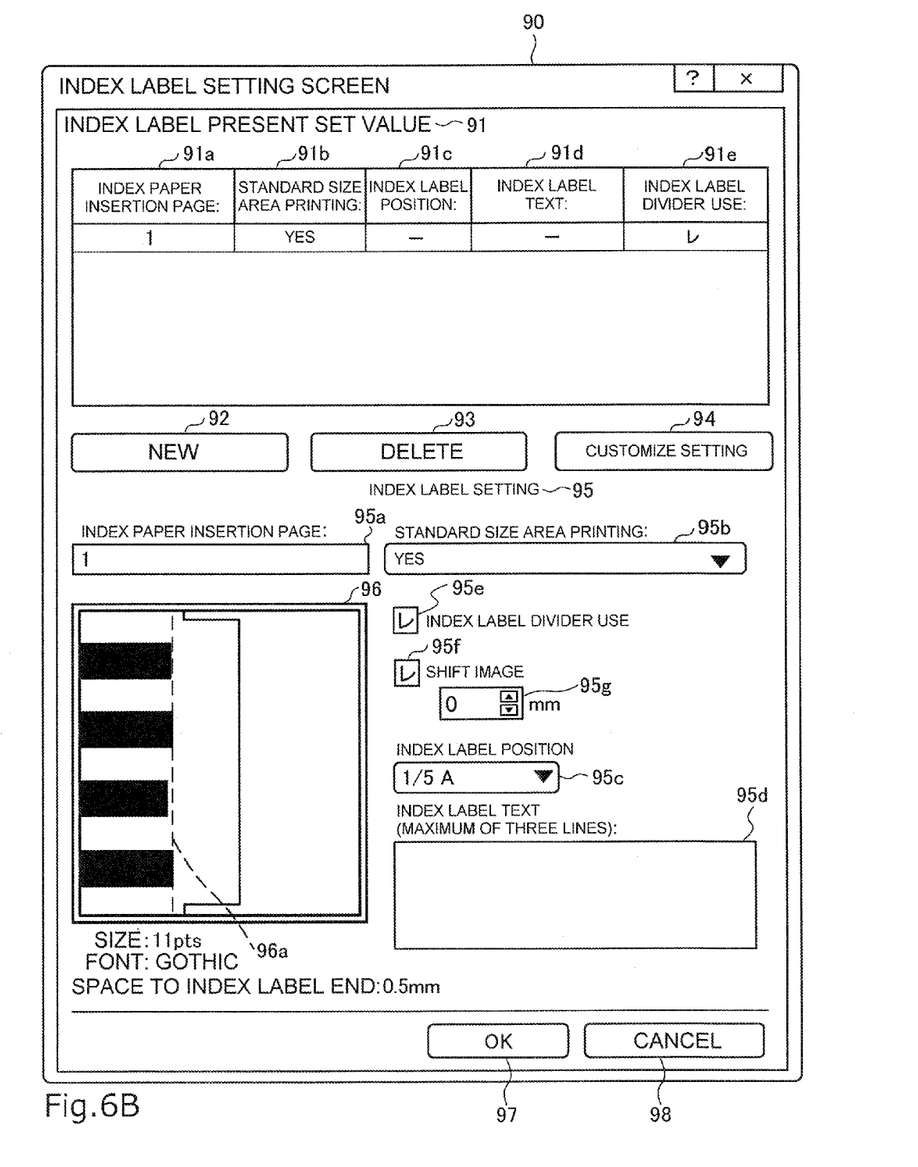
FIG. 6B is a figure showing an example of the index label setting screen where the shift image is displayed related to the embodiment of the present disclosure.
Figure 6C:
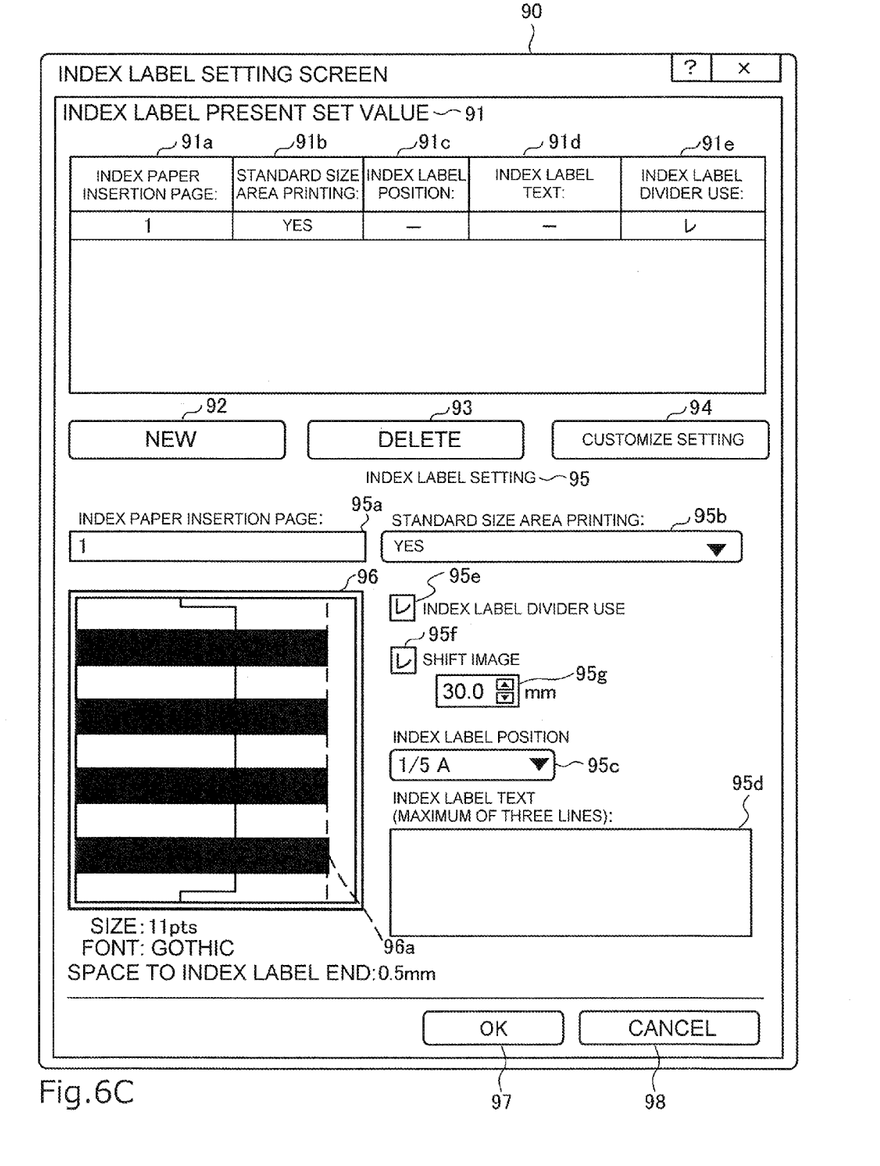
FIG. 6C is a figure showing an example of an index label setting screen where the shift image is displayed related to the embodiment of the present disclosure.

Then, an index paper setting screen 80 as shown in FIG. 4, an index label setting screen 90 as shown in FIG. 5, an index label setting screen 90 as shown in FIG. 6A, FIG. 6B, and FIG. 6C is explained. The index paper setting screen 80 shown in FIG. 4 is a screen that sets up index paper information. The index label setting screen 90 shown in FIG. 5 is a screen that sets up index label information. The index label setting screen 90 shown in FIG. 6A, FIG. 6B, and FIG. 6C are screens, which each example of a shift image in an index label is displayed on the preview of the index label, respectively. In case of printing an index paper, a user operates the touch panel of the liquid crystal display part 51, displays the index paper setting screen 80 and the index label setting screen 90, and sets up.

The index paper setting screen 80 as shown in FIG. 4 includes a "number of index labels" 81, a "print size" 82, a "index label space" 83, a the setting item of "index label size" 84, an "index paper preview" 85, an "Index label preview" 86 as display area, an "OK" button 87, and a "cancel" button 88.

The "number of index labels" 81 is a setting field that sets up a number of the index labels of the index paper in continuous printing. A type of printing that is not continuous printing (henceforth "single printing") "1" is set as the "number of index labels" 81.

"Print size" 82 is a setting field that sets up a printing paper size of the section excluding the index label (henceforth "printing paper size"), and a side (a long side or a shorter side) in which the index label is provided. For example, when the printing paper size is A4, and the index label is provided in the long side of the print sheet, "A4 long side" is set.

The "index label space" 83 is a setting field that sets up the index label formed in a different position in the index paper for continuous printing or single printing. The "index label space" 83 includes setting fields to set a "space from head to first index label" 83*a*, a "space between index labels" 83*b*, and a "space from end to last index label" 83*c*. At the time of single printing, since the number of index labels is one, "0" is set as the "space between index labels" 83*b*.

The "index label size" 84 is a setting field which sets up the size of an index label. The "Index label size" 84 provides a setting field that sets up a "height" 84*a* of an index label which has protruded from the print sheet having the standard size. In addition, at the index paper setting screen 80 of FIG. 4, although the width of the index label is fixed by an initial setting, modification of a setup about this value is possible.

The "index paper preview" 85 is display area that displays a preview of the index paper(s). By changing a set value of the "number of index labels" 81, the "print size" 82, the "space from head to first index label" 83*a* of "index label space" 83, the "space between index labels" 83*b*, the "space from end to last index label" 83*c*, or the "height" 84*a* of the "index label size" 84, the preview of the index paper displayed on the "index paper preview" 85 changes. Also, when no value is set as the "number of index labels" 81, the "print size" 82, and the "index label space" 83, the preview of the index paper is not displayed on the "index paper preview" 85.

The "index label preview" 86 is display area that displays the preview of the index label. By changing set value of the "height" 84*a* of the index label for the "index label size" 84, the preview of the index label displayed on the "index label preview" 86 changes. Also, when no value is set to the "index label size" 84, the preview of the index label is not displayed on the "index label preview" 86. The width of the index label may be fixed by initial setting, and the width of this initial setting may be used.

The "OK" button 87 is a button depressed when storing the set point of a setting field at storage part 8. Depression of the "OK" button 87 will store the set point of index paper setting screen 80 at storage part 8.

The "cancel" button 88 is a button depressed when canceling the set point of index paper setting screen 80. When "cancel" button 88 is depressed, the set point set as index paper setting screen 80 will be canceled, and it will return to the last set point.

The index label setting screen 90 as shown in FIG. 5 includes a display item of an "index label present set value" 91, a "new" button 92, a "delete" button 93, a "customize setting" button 94, a setting item of "index label setting" 95, a display area of a "index label preview" 96, a "OK" button 97, and "cancel" button 98.

The "index label present set value" 91 is display area where a set value of the index label being set presently and being stored in the storage part 8 (henceforth the "present set value") is displayed. The "index label present set value" 91 provides a display column that displays a present set value by list for an "index paper insertion page" 91*a*, a "standard size area printing" 91*b*, an "index label position" 91*c*, an "index label texts" 91*d*, and an "index label divider use" 91*e*. In the "index paper insertion page" 91*a*, a present set value of a number of pages inserted between one index paper and another index paper is displayed. In the "standard size area printing" 91*b*, a present set value for existence (Yes) or non-existence (No) of printing in an area of the standard size section of the index paper is displayed. In the "index label position" 91*c*, a present set value of a position of the index label about the number of the index labels of an index paper in the continuous printing is displayed. "A" is displayed when the position of the index label is set up automatically. For example, when "5" is set as the "number of index labels" 81 and "1" is set as the "index label position" 91*c*, automatically, is shown, and it is displayed as "1/5A." In addition, "1" of the "index label position" 91*c* shows order about "5" of the "number of index labels" 81. In the "index label texts" 91*d*, a present set value of an index label text printed at the index label is displayed. In the "index label divider use" 91*e*, display existence or non-existence of the index label is displayed at the preview of the index paper.

The "new" button 92 is a button depressed in case of re-displaying the display column of the "index label present set value" 91 newly. By depressing the "new" button 92, a present set value of the setting item set up in "index label setting" 95, which is stored in the storage part 8, will be shown.

The "delete" button 93 is a button to depress for deleting set value currently displayed on the display column of the "index label present set value" 91. In case of depressing the "delete" button 93, the present set value of the index label in the storage part 8, which is currently displayed on the display column of the "index label present set value" 91, will be deleted.

The "customize setting" button 94 is a button to depress when the user customizes a format and a layout of the index label text. Depression of the "customize setting" button 94 will display a customization setting screen.

The "index label setting" 95 is setting area where a setup of the index label is performed. The "index label setup" 95 includes a setting field which sets up an "index paper insertion page" 95*a*, a "standard size area printing" 95*b*, an "index label position" 95*c*, an "index label texts (maximum of three lines)" 95*d*, an "index label divider use" 95*e*, a "shift image" 95*f*, and a "shift size" 95*g*.

In the "index paper insertion page" 95*a*, the number of pages inserted between one index paper and another index paper is set up. In the "standard size area printing" 95*b*, the printing existence (Yes) or non-existence (No) in the area of the standard size section of the index paper is set up. In the "index label position" 95*c*, the position of the index label to the number of the index labels for the index paper in continuous printing is set up. In addition, when a user sets up not all the positions of an index label but sets up automatically, for example, as shown in "1/5A," subsequent index label positions are set up by adding "A" to a top index label position "1/5." The "index label texts (maximum of three lines)" 95*d*, the text printed at the index label is set up. In addition, in the "index label texts (maximum of three lines)" 95*d*, text(s), such as a maximum of three lines of characters, can be set.

The "index label divider use" 95*e*, the display existence or non-existence of the index label is set up in the preview of an index paper. When the "index label divider use" 95*e* is checked as setting, the index label is displayed on the "index paper preview" 85 that are the preview of the index paper. Otherwise, when the "index label divider use" 95*e* is not checked as setting, the index label is not displayed on the "index paper preview" 85.

In the "shift image" 95*f*, when the text or the like, which are printed to the standard size section and/or an index label section are set to the manuscript, whether displaying or not-displaying the shift image that is expressed the image area of the manuscript with the belt-like pattern in the preview of the index label is set up. In the "Shift size" 95*g*, when the "shift image" 95*f* is checked as setting, the width that moves in the right end of the image area of the manuscript is set up. When the "shift image" 95*f* is checked as setting, in the "index label preview" 96, a shift image, which the image area of the manuscript is moved to the right only size of the "shift size" 95*g*, is displayed. In this case, even if a text is set to the "index label texts (maximum of three lines)" 95*d*, the text is not displayed on the "index label preview" 96. An example of the shift image displayed on the "index label preview" 96 is described later. Unless the "shift image" 95*f* is checked as setting, the shift image is not displayed on the "index label preview" 96. In this case, when the text is set to the "index label texts (maximum of three lines)" 95*d*, the text will be displayed on the "index label preview" 96.

The "index label preview" 96 is display area that displays an image of the index label. By the set value of the "index label texts (maximum of three lines)" 95*d*, the preview displayed on the "Index label preview" 96 changes. In case the "shift image" 95*f* is checked as setting, when set value of the "shift size" 95*g* is changed, the preview displayed on the "index label preview" 96 also changes. Also, when no text is set to the "index label texts (maximum of three lines)" 95*d*, the preview of the index label is not displayed on the "index label preview" 96. Also, when the "shift image" 95*f* is not checked as setting, the preview of the index label is not displayed on the "index label preview" 96.

The "OK" button 97 is a button depressed when storing a set value of the setting field to the storage part 8. When the "OK" button 97 is pushed, the set value of the index label setting screen 90 is stored to the storage part 8.

The "cancel" button 98 is a button depressed in case of canceling a set value of the index label setting screen 90. When "cancel" button 98 is pushed, the set value set as the index label setting screen 90 will be canceled, and it will return to the last set value.

Then, an example of the shift image displayed on the "index label preview" 96 of the index label setting screen 90 is explained by using FIG. 6A, FIG. 6B, and FIG. 6C. The "index label preview" 96 in FIG. 6A is an example of a preview of being displayed image area in case that the "shift image" 95*f* is checked as setting and "10.0" mm is set to the "shift size" 95*g*. That is, in the "index label preview" 96, the preview of the index label, when a right end line 96*a* of the image area of the belt-like pattern moves to the 10.0-mm right, is displayed. The "index label preview" 96 in FIG. 6B is an example of a preview of being displayed image area in case that the "shift image" 95*f* is checked as setting and "0" mm is set to the "shift size" 95*g*. That is, in the "index label preview" 96, the preview of the index label, when the right end line 96*a* of the image area of the belt-like pattern does not move, is displayed. The "index label preview" 96 in FIG. 6C is an example of a preview of being displayed image area in case that the "shift image" 95*f* is checked as setting and "30.0" mm is set to the "shift size" of 95*g*. That is, a preview of the index label when the right end line 96*a* of image area of the belt-like pattern moves to the 30.0-mm right, is displayed on "index label preview" 96. Thus, the user check as setting the "shift image" 95*f*, and by changing set value of the "shift size" 95*g*, a printing request can be performed after adjusting the width for moving the right end line 96*a* of the image area of the belt-like pattern.

On the above mentioned, as shown in FIG. 5, FIG. 6A, FIG. 6B, and FIG. 6C, setting fields of the "shift image" 95*f* and the "shift size" 95*g* in the index label setting screen 90 are used for performing set up. By using such the index label setting screen 90, also in the case that a printing request is performed with the manuscript set up the text or the like, which are printed into a standard size section and an index label section, when the user only check the "shift image" 95*f* as setting, the shift image expressing the image area of the manuscript with the belt-like pattern to the "index label preview" 96 can be displayed. Also, the right end line 96*a* of the image area of the belt-like pattern can be moved easily by changing set value of the "shift size" 95*g* by the user. Thus, the user can verify the index label section in case of moving the right end line 96*a* of the image area of the belt-like pattern towards the right only with the width of the "shift size" 95*g* by the "index label preview" 96. The user can verify the print image by the "index paper preview" 85 about the index paper.

That is, a typical printer controller only provides, by a screen that sets up an information on a tab paper or a tab, a setup for an information on a tab paper or a tab, an item for inputting information including a title or the like of the text for printing to the tab, and a screen for displaying the preview of a tab paper or a tab. Therefore, there is a problem that information including the title or the like of the text printed to the tab can be verified by the preview of the tab, when the text or the like, which are printed to a standard size section and an index label section are set to the manuscript and the text of the manuscript is printed to the index label, this screen cannot be used.

On the other hand of the image forming apparatus in the present embodiment, in the case where the text or the like to print to the standard size section and an index label section are set to the manuscript, the preview of the printing region of the index label can be displayed from the screen that sets up the information on the index paper or the index label. Thereby, a user can handle printing of the standard size section and the index label section of an index paper easily.

Furthermore, in the embodiment, a shift image of the image area of the manuscript with expressing the belt-like pattern is displayed to the "index label preview" 96. However, it is not limited to the belt-like pattern but all patterns, colors, or the like, can be displayed if the user can recognize the image area of the manuscript by using them.

Also, in the embodiment, the display of the shift image of the index label in the "index label preview" 96, which the image area of the manuscript is moved by the right only "shift size" 95g, is explained. However, this is an example in case that the index label is formed in the right side of the index paper. On the other hand, when the index label is formed in the left side of the index paper, it is also possible to display a shift image, which is moved the image area of the manuscript to the left only for "shift size" 95g, on the "index label preview" 96. Also, when the index label is provided upper part or lower part of the index paper, it is also possible to display the shift image, which is moved the image area of the manuscript to up or down only for the "shift size" of 95g, on the "index label preview" 96. Thus, in the present disclosure, an image area of a manuscript is movable the position to the side where the index label is provided on the index paper.

Also, in the embodiment, although the user operates the touch panel of the liquid crystal display part 51, displays the index paper setting screen 80, or index label setting screen 90, and set up the set values, it is not limited to this way. For example, a print driver of the image forming apparatus 1 is installed in the peripheral equipment 11, such as PC as shown in FIG. 3, and a user may indicate to display the index paper setting screen 80 or the index label setting screen 90 on the display panel of the peripheral equipment 11 by using the print driver. Then, it is also possible: while the user verifies the "index label preview" 96, the "shift size" of 95g is set up, and the printing request of the index paper is transmitted to the image forming apparatus 1.

Also, a setting item and a display item of the index paper setting screen 80 or the index label setting screen 90 are not limited to them. If information on an index paper or an index label can be set up so that printing of an index paper may be attained, it is also possible to consider it as other setting items and a display item.

Also in the case of such the present disclosure of the image forming apparatus where the text or the like to print is set up in the manuscript at the standard size section and the index label section, the preview of the printing region of the index label is displayed from a screen sets up the information on the index paper or the index label. Thereby, a user can print a standard size section and an index label section of the index paper, easily.

As mentioned above, although the present disclosure is explained the detailed embodiment, the above-mentioned embodiment is exemplification of the present disclosure, and it cannot be overemphasized that it is not limited to the embodiment.

Also, a technology of the present disclosure is suitable for an image forming apparatus. However, it is not limited to the image forming apparatus. That is, the technology of the present disclosure is applicable to a general apparatus and process provided with being discharged or conveyed the index paper.

What is claimed is:

1. An image forming apparatus being able to print a manuscript to an index paper, wherein the manuscript comprises text and wherein the index paper comprises a standard size section and an index label section, the image forming apparatus comprising:
   a display part,
      wherein the display part displays an index label setting screen that includes:
         a box for displaying and receiving user input of index label text printed in an index label, and
         a check box for receiving a user input to:
            set the text of the manuscript to print to the standard size section and the index label section, and thereby
            cause the display part to display a shift image indicating the text which is printed to both the standard size section and the index label section, and
         wherein the standard size section includes an A4 size section or a letter size section, wherein the index label section is provided outside of the standard size section;
   an index label information setting part that sets up index label information via the index label setting screen;
   an index label preview display part that displays, in the index label setting screen, a first preview including the index label that is set by the index label information;
   a shift size setting part that sets up a value of a shift size for moving the text of the manuscript;
   an image area shifting part that moves the text of the manuscript only the value of the shift size; and
   a shift image display part that displays, in the index label setting screen, a second preview including a preview of the index label,
   wherein, if the text which is printed to the standard size section and the index label section is set to the manuscript text by the check box being checked, the second preview is displayed,
   wherein the second preview displays a preview of the setting result of the shift size value for moving the text in the manuscript by expressing the manuscript text as a belt pattern, and
   wherein, when the check box is checked, even if the index label text printed in the index label is set to the box in the index label setting screen, the index label text is not displayed on the index label included in the second preview.

2. An image formation method performed by an image forming apparatus to possibly print a manuscript to an index paper, wherein the manuscript comprises text, and wherein index paper comprises a standard size section and an index label section, wherein the standard size section includes a A4 size or a letter size, wherein the index label section is provided outside a range of the standard size section, the image formation method comprising:
   instructing setup of the image forming apparatus;
   displaying:
      an index label setting screen that includes a box for receiving user input of an index label text printed in an index label and displaying the index label text, and
      a check box for receiving a user input for:
         setting the text of the manuscript to print to the standard size section and the index label section; and
         setting whether to indicate on the display a shift image of the text which is printed to both the standard size section and the index label section;
   setting up index label information via the index label setting screen;

displaying, in the index label setting screen, a first preview including the index label that is set by the index label information;

setting up a shift size for moving the text of the manuscript;

moving the text of the manuscript only the width of the shift size; and displaying, in the index label setting screen, a second preview including a preview of the index label, wherein, if the text which is printed to the standard size section and the index label section are set to the manuscript by the check box being checked, the second preview is displayed, wherein the second preview displays a preview of the setting result of shift size for moving the text in the manuscript by expressing in a belt pattern, and wherein, when the check box is checked, even if the index label text printed in the index label is set to the box in the index label setting screen, the index label text is not displayed on the index label in the second preview.

3. A non-transitory computer-readable recording medium storing an image formation program to be executed by an image forming apparatus being able to print a manuscript to an index paper, wherein the manuscript comprises text and wherein the index paper comprises a standard size section and an index label section, the image formation program causing a computer to function as:

a display part,
wherein the display part displays:
an index label setting screen that includes a box for displaying and receiving user input of an index label text printed in an index label, and
a check box for receiving a user input to:
set the text of the manuscript to print to the standard size section and the index label section; and thereby
cause the display part to display a shift image of the text which is printed to both the standard size section and the index label section, and
wherein the standard size section includes an A4 size or a letter size wherein the index label section is provided outside a range of the standard size section;
an index label information setting part that sets up index label information via the index label setting screen;
an index label preview display part that displays, in the index label setting screen, a first preview including the index label that is set by the index label information;
a shift size setting part that sets up a value of a shift size for moving the text of the manuscript;
an image area shifting part that moves the text of the manuscript only the value of the shift size; and
a shift image display part that displays, in the index label setting screen, a second preview including a preview of the index label,
wherein, if the text which are printed to the standard size section and the index label section are set to the manuscript by the check box indicating the shift image being checked, the second preview is displayed,
wherein the second preview displays a preview of the setting result of the shift size value for moving the text in the manuscript by expressing the manuscript text as a belt pattern, and
wherein, when the check box is checked, even if the index label text printed in the index label is set to the box in the index label setting screen, the index label text is not displayed on the index label included in the second preview.

4. The non-transitory computer-readable recording medium according to claim 3, wherein the belt pattern extends from the standard size section to the index label section, and wherein the distance of extension of the belt pattern from the standard size section to the index label section is dependent on the value of the shift size.

5. The image forming apparatus according to claim 1, wherein the belt pattern extends from the standard size section to the index label section, and wherein the distance of extension of the belt pattern from the standard size section to the index label section is dependent on the value of the shift size.

6. The image formation method according to claim 2, wherein the belt pattern extends from the standard size section to the index label section, and wherein the distance of extension of the belt pattern from the standard size section to the index label section is dependent on the value of the shift size.

* * * * *